July 17, 1962 C. B. WICKER 3,044,800
AUTOMOTIVE VEHICLE SAFETY BARRIER
Filed April 21, 1961 3 Sheets-Sheet 1
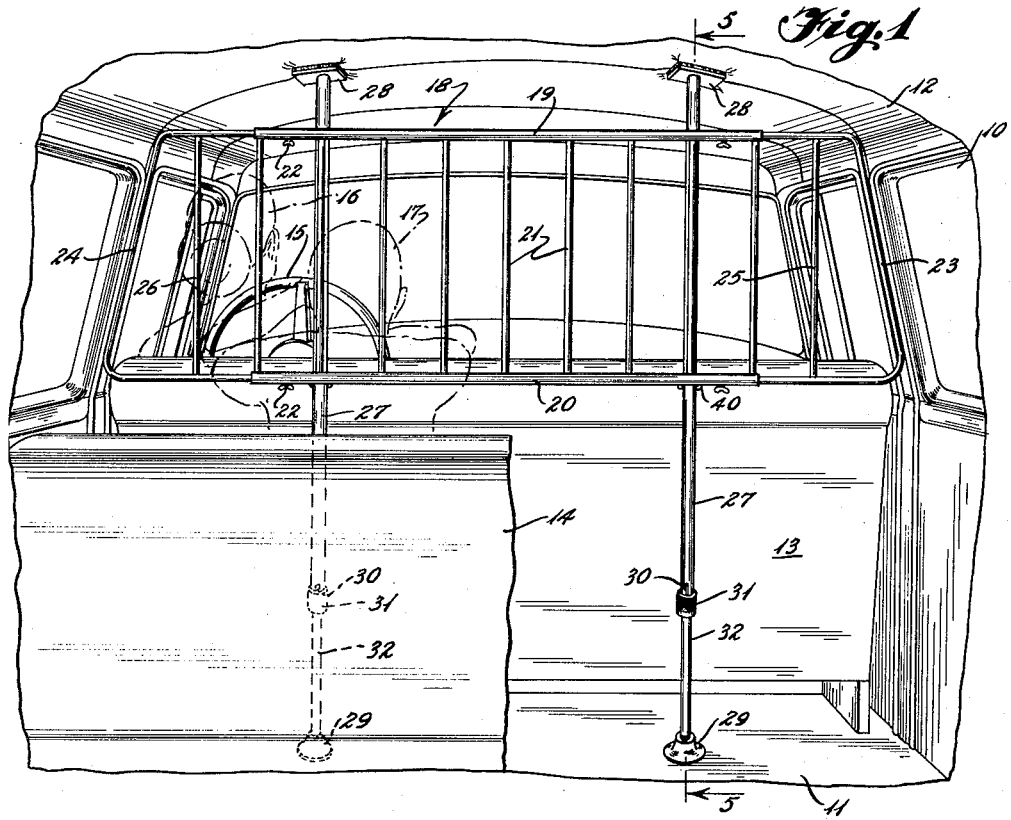
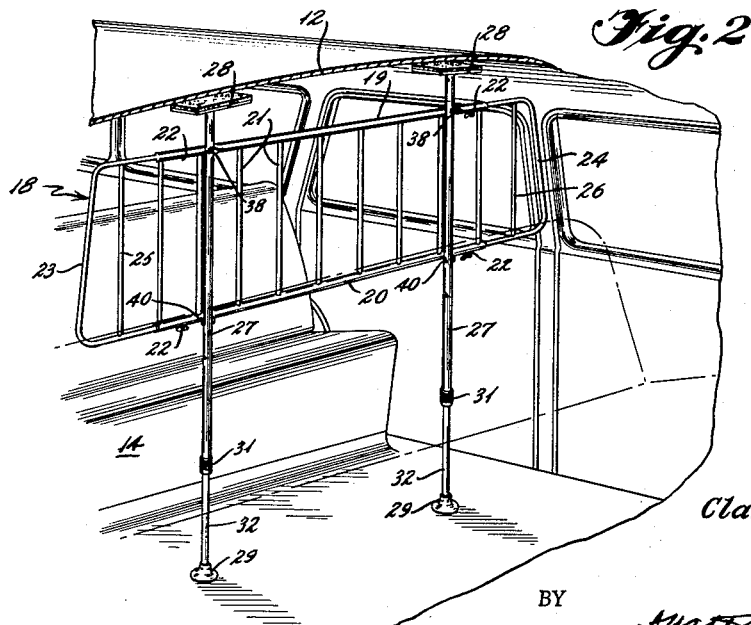
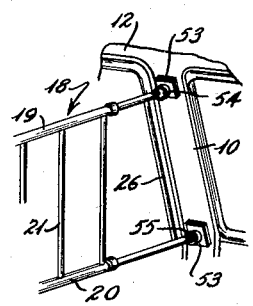
INVENTOR
Clarice B. Wicker
BY
ATTORNEY July 17, 1962 C. B. WICKER 3,044,800
AUTOMOTIVE VEHICLE SAFETY BARRIER
Filed April 21, 1961 3 Sheets-Sheet 2
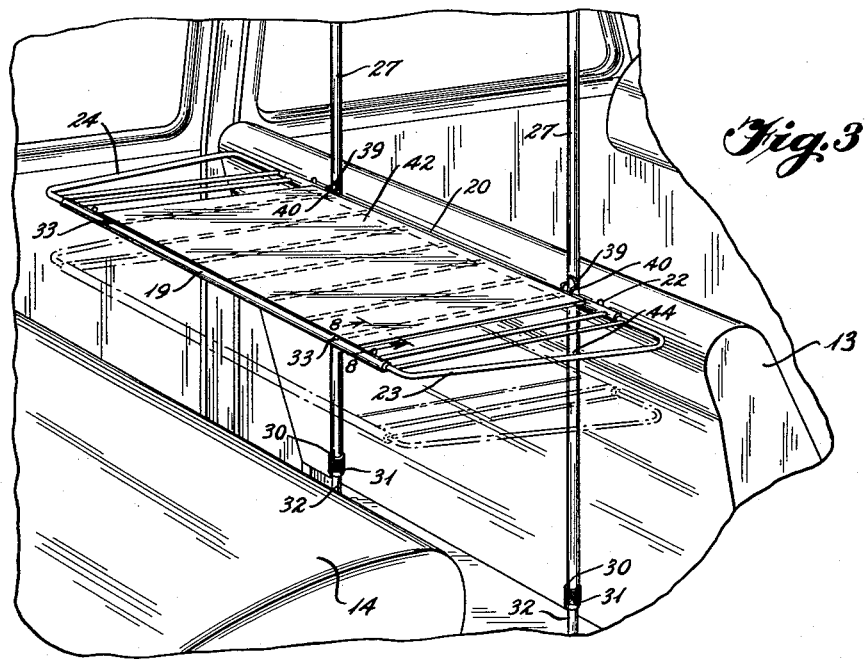
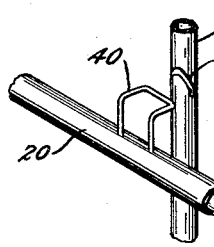
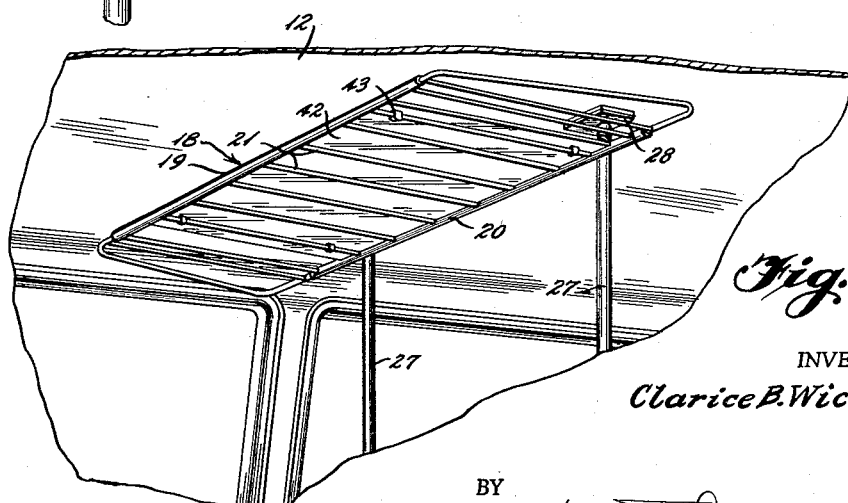
INVENTOR
Clarice B. Wicker
BY
ATTORNEY July 17, 1962  C. B. WICKER  3,044,800
AUTOMOTIVE VEHICLE SAFETY BARRIER
Filed April 21, 1961  3 Sheets-Sheet 3
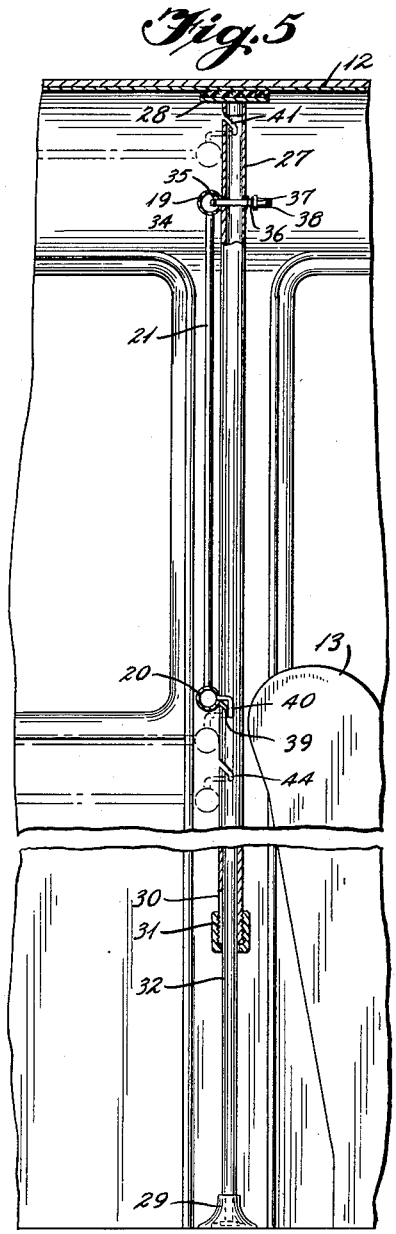
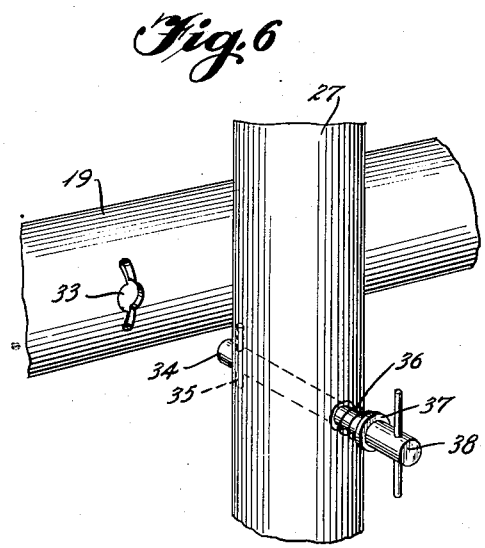
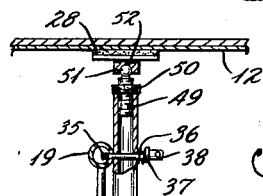
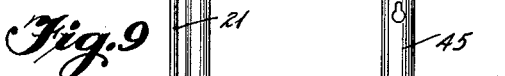
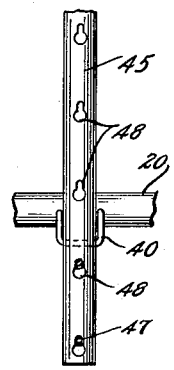
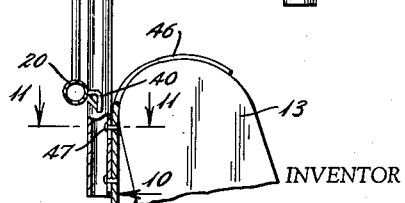
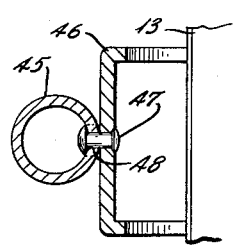
INVENTOR
Clarice B. Wicker
BY
ATTORNEY

United States Patent Office 3,044,800
Patented July 17, 1962

3,044,800
AUTOMOTIVE VEHICLE SAFETY BARRIER
Clarice B. Wicker, Burns Drive, Rte. 4, Sanford, N.C.
Filed Apr. 21, 1961, Ser. No. 104,734
3 Claims. (Cl. 280—150)

This invention relates to habitable structures including those of vehicular mobile type and to features of their construction by the use if the same is enlarged and made more satisfactory and the welfare of the users improved.

The invention relates to safety devices for use with vehicles of various types including with automobiles and particularly to a safety barrier for application between the driver and the area at the rear thereof where passengers which sometimes include small children ride and by means of which barrier substantial physical interference with the driver by the passengers is prevented.

In passenger automobiles used by the vast majority of families there is no means of keeping passengers and particularly small children from reaching or climbing over the front seat and gripping the person or the clothing of the operator as well as other objects in the front area of the vehicle. This has resulted in accidents and damage to person and property and has made it desirable to provide a barrier between the driver's area and the passenger area and efforts have been made to solve the problem but such devices have been of limited use, of impractical construction, and otherwise unsatisfactory.

It is an object of the invention to provide a vehicle safety barrier of simple and inexpensive construction which can be easily manufactured, applied with minimum effort in a minimum of time, as well as a safety barrier which can be stored in an out of the way position in the top of the car when not in use and can be used in either of several positions including in upright barrier constituting position, and in horizontal position at multiple levels.

Other objects and advantages of the invention will be apparent from the following description taken in conjunction with the accompanying drawings wherein:

FIG. 1 is a fragmentary rear perspective of the interior of a vehicle illustrating the use of the invention;

FIG. 2, a fragmentary front perspective thereof;

FIG. 3, a further rear perspective illustrating the barrier of the invention of FIGS. 1 and 2 in full lines in one position and in dotted lines in a second and lower position;

FIG. 4, a perspective from beneath the barrier of the preceding figures in stored position;

FIG. 5, a vertical section on the line 5—5 of FIG. 1;

FIG. 6, an enlarged fragmentary detail of the connection between the upper barrier side rail and one of the supporting posts;

FIG. 7, an enlarged fragmentary detail of the connection between the lower barrier side rail and one of the supporting posts;

FIG. 8, a section on the line 8—8 of FIG. 3;

FIG. 9, a modified structure in which the barrier is mounted between the top and the back of the front seat and the roof;

FIG. 10, an enlarged fragmentary detail perspective of the connection between the mounting post and the seat bracket of FIG. 9;

FIG. 11, a horizontal section on the line 11—11 of FIG. 9; and

FIG. 12, a fragmentary perspective of a barrier held at its ends instead of uprights.

Briefly stated, the invention is an extensible barrier composed of generally parallel side rails and transverse connecting bars with adjustable extremities to fit cars of different widths. The barrier is adapted to be mounted upon a pair of supporting posts of adjustable length having cushion pad for engagement with the roof and resilient or cushion feet which rest upon the floor of the vehicle. Each of the posts is provided with a downwardly extending slot near its upper portions and in two locations therebelow, one in the horizontal plane of the top of the front seat and the second just below the same and with openings and fastening elements which extend through the post and the upper edge of the barrier when staples on the lower end are disposed within the upper of the slots in the post. These staples are right angular with the portion remote from the side rails parallel to the plane of the barrier and the other portions at right angles to such plane and welded or otherwise fixed to the side rails. Thus when the staples are engaged in the openings in the posts and the barrier lowered to horizontal position, the side rail of the barrier will engage the post and the barrier will be maintained in such horizontal position and regardless of whether at the top of the post or the two lower positions where the notches or slots are located at the top of the front seat and slightly below the same. When the staples of the barrier are in the slots at the top of the front seat, the fasteners may be secured through the posts and the upper portions of the barriers to secure them in fixed relation. If preferred, the posts instead of extending from floor to roof may extend from back of front seat to the roof and support the posts in the same manner as described. If desired, a table top may be attached by clips to the barriers and serve for the support of objects such as food, books, cards or the like in either of the horizontal positions of adjustment.

With continued reference to the drawings, an automobile 10 of conventional construction has a floor 11, a roof 12, front and rear seats 13 and 14 with the usual doors for ingress and egress and with a steering wheel 15 for convenient operation by a driver 16 on the front seat.

The present invention is intended to prevent a child or other passenger 17 on the rear seat 14 or behind the front seat 13 from getting beyond the rear of the front seat and interfering either with the driver or with anything within the front area of the vehicle.

The present invention is a grill-type barrier 18 mounted for disposition in an upright or horizontal positions to serve both as a barrier and as a support. Also the barrier is of adjustable length in order that it may be applied to the bodies of automobiles or other vehicles of different widths and is mountable for use in horizontal position at multiple elevations.

The barrier 18 has tubular top and bottom rails 19 and 20 and a series of cross rails 21 providing a barrier structure fixed thereto in uniformly spaced relation. The spaced tubular rails 19 and 20 are provided near their extremities with set screws between the cross bars 21 in out of the way positions in the plane of the cross bars 21, such set screws serving to retain adjustable end frames 23 and 24 in fixed positions, each of which end frames may be composed of generally U-shaped members each with a cross member or brace 25 or 26.

The barrier 18 is adapted to be supported by means of spaced posts 27 each having a padded ceiling engaged member 28 at its upper end and an internal threading cushion foot 29 at its lower end in order to provide for the extensibility or length variation of the posts 27.

Each of the posts 27 preferably is hollow or tubular and has a slotted externally threaded lower end 30 on which is mounted a clamping nut 31 to secure, within the lower end of the post 27, a shaft 32 having its lower end threaded or otherwise connected with the cushion foot 29.

The barrier 18 has its tubular top member 19 provided with spaced openings 33 providing fastener means each in the form of a transverse slot with an enlarged central portion for the reception of a cooperating fastener means or latch 34, one carried by each of the posts 27 near the upper end of the latter. Each cooperating fastener means or latch has a pin 35 adapted to enter the fastener means or opening 33 and be rotated so that the pin is across the opening lengthwise of the post to prevent its removal.

The cooperating fastener means 34 is provided with a spring 36 on rear end adapted to bear against a shoulder or washer 37 by means of which the cooperating fastener means is maintained retracted under spring tension, the cooperating fastener means being provided wtih a cross arm 38 by which it can be manually operated. When the barrier 18 is in a position to prevent interference between the occupants of the rear and the front seats as illustrated in FIGS. 1 and 2, the fasteners 34 will extend through the openings 33 and the pins 35 will be across the opening to maintain the parts connected.

In order to anchor the lower side rail 20 relative to the posts 27, each post is provided with an angular slot 39 providing a cooperating fastener means and the rail connecting portion has a right angular staple or generally U-shaped member 40 attached to the rail 20 providing a fastener means, there being 2 of each such staples and slots one set adjacent each of the posts 27 and also there being two of such latches 34 and openings 33. The action of the staple 40 and the rail 20 provide a stop in which the rail 20 abuts the post 45 in the horizontal table position shown in FIG. 3 or the storage position shown in FIG. 4, preventing the barrier central section from pivoting below the horizontal planes shown in such figures.

In securing the barrier in fixed position the spaced staples 40 providing a first fastener means on the lower side rail 20 will first be placed within the slots 39 forming the first cooperating fastener means in the posts and in the barrier 18 swung to its upright position until the cooperating fastener means 34 and the cross pins 35 pass through the openings 33 in the upper side rail 19 of the barrier, and upon rotation of the cooperating fastener means the pins 35 will extend across the openings 33 and retain the parts in assembled relation. Due to the curvature of the interior of the tubular side rail 19, it will be impossible for the parts to be brought to position to be accidentally disengaged.

When it is not desired to use the barrier, it may be disposed in an out-of-the-way position near the top of the vehicle rearwardly of the front seat with the staples 40 in the slots 41 in the upper end portions of the posts 27. In this position the lower side rail 20 will bear and be held against the posts by the weight of the unsupported portion of the barrier providing top structure as illustrated as shown in dash dot lines in FIG. 5, the barrier being adjacent the top of the vehicle as further illustrated in FIG. 4.

When the barrier is in use and fastened in upright position it may have its upper portion released by releasing the cooperating fastener means 34 whereupon it can be swung down to a substantially horizontal position where it will be retained by the staples 40 in the slots 39 and the lower side member 20 bearing against the spaced upright posts 27. In this position a table top 42 may be applied, and such table top may have spring clips 43 by which it may be secured to the cross members 21 of the barrier. This table top may be made of transparent plastic and may be left attached to the barrier and due to the manner of connection can be adjusted along the length of the barrier. With the barrier in horizontal position and a table top applied, it may be used by occupants of both the front and rear seats. If desired the barrier 18 may be supported at a lower elevation by providing additional slots 44 in the posts 27 where it may be used for food, refreshment, cards or other objects.

In FIGS. 9, 10 and 11 there is disclosed a barrier and mounted means therefor by means of which a barrier may be supported between the top of the back of the front seat 13 and the roof 12. In this embodiment of the invention the barrier 18 is the same as that previously described and is mounted between the top of the back of the front seat 13 and the roof 12 by means of a pair of tubular posts 45 the lower ends of which are adjustably fixed to a curved seat encircling arms 46 by means of studs 47 and bayonet slots 48.

The post 45 receives in its upper end a threaded stud 49 about which is threaded a manipulating nut 50 which bears against the upper end of the post 45 for adjusting the stud 49 lengthwise therein. The stud 49 has a ball 51 which fits in a socket 52 on the roof engaging member 28. Thus an adjustment is provided at each of the ends of the posts 45.

In FIG. 12 is illustrated a construction in which the barrier 18 with studs which can be extended and provided with mounting cushion pads 53 for engagement with the inner surfaces of the sides of the automobile, cooperating threaded telescoping members 54 and 55 connecting said mounting pads to said barrier.

It will be obvious from the foregoing that a relatively simple practical structure is provided which can be readily applied, used and removed, and which will effectively perform the functioning for which it was produced.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A device for use in a vehicle as a barrier for limiting the movement of objects and comprising multiple posts of adjustable length for disposition in the vehicle in upright position, said post having cushioning members at their upper and lower ends for engagement with the roof and floor of the vehicle for anchoring the posts in place, a barrier for mounting on said posts, said barrier comprising a central section and extensible end sections, means for mounting said barrier on said posts in an elevated out of the way position when not in use, in an upright operative position of use, and in at least one generally horizontal position for supporting objects thereon, said means comprising cooperating fasteners on said barrier and posts including right angular staples attached to the sides of said barrier substantially at right angles to the plane of the latter, and said posts having inclined slots therein in which said staples are adapted to be received and the barrier supported, and additional means remote from said angular staples for fastening portions of said barrier when in upright position to said posts.

2. A device for use in a vehicle as a barrier for limiting the movement of objects and comprising multiple posts of adjustable length for disposition in the vehicle in upright position, a barrier for mounting on said posts, said barrier comprising a central section and extensible end sections, means for mounting said barrier on said posts in an elevated out of the way position when not in use, in an upright operative position of use, and in at least one generally horizontal position for supporting objects thereon, said means comprising cooperating fasteners on said barrier and posts including right angular staples attached to the sides of said barrier substantially at right angles to the plane of the latter, and said posts having inclined slots therein in which said staples are adapted to be received and the barrier supported, and additional means remote from said angular staples for fastening portions of said barrier when in upright position to said posts.

3. A barrier for closing one section of a vehicle from another section thereof, said barrier comprising a barrier having a central section including top and bottom rails and barrier structure extending between said rails, adjustable end frames mounted on the ends of said barrier to vary the effective length thereof for accommodation to wide or narrow vehicles, a pair of posts, means to mount said posts in parallel relation to each other and spaced apart less than the length of said central section, first fastener means on the lower rail of said central section spaced apart a distance corresponding to the spacing between the posts, first cooperating fastener means on said posts substantially at table height for cooperation with said first fastener means, second cooperating fastener means substantially at the top of said posts for cooperation with said first fastener means, second fastener means on said top rail spaced apart a distance corresponding to the spacing between said posts, third cooperating fastener means adjacent the upper ends of the posts for cooperation with the second fastener means on the upper rail for securing said barrier in closing position when the first fastener means on the lower rail are in cooperative relation with the first cooperating fastener means on the posts, all of said fastener means being releasable, said first fastener means on the lower rail and said first and second cooperating fastener means on said posts providing stop structure limiting the angular position of the barrier to a substantially horizontal position when said first fastener means is cooperating with said first or second cooperating fastener means while permitting the barrier to be pivoted about said first fastener means and said first cooperating fastener means to a substantially vertical position whereby said barrier can be arranged in horizontal position as a table, in vertical position as a barrier, or in a horizontal position adjacent the top of the posts for storage.

References Cited in the file of this patent

UNITED STATES PATENTS

| | | |
|---|---|---|
| 2,740,642 | Atwood | Apr. 3, 1956 |
| 2,749,143 | Chika | June 5, 1956 |
| 2,892,495 | Hadden | June 30, 1959 |
| 2,982,579 | Greenwald | May 2, 1961 |
| 2,997,331 | Kudner | Aug. 22, 1961 |